United States Patent [19]

Hattori

[11] 4,396,086

[45] Aug. 2, 1983

[54] MOTORCYCLE FRONT SYMBOL PLATE

[75] Inventor: Toshiyuki Hattori, Iwata, Japan

[73] Assignee: Yamaha Hatsudoki Kabushiki Kaisha, Iwata, Japan

[21] Appl. No.: 253,666

[22] Filed: Apr. 13, 1981

[30] Foreign Application Priority Data

Apr. 23, 1980 [JP] Japan .................................. 55-54014

[51] Int. Cl.³ ...................... B60K 11/04; B62K 11/00
[52] U.S. Cl. .................................. 180/229; 180/68 R
[58] Field of Search ............ 180/229, 225, 219, 54 A, 180/68 R, 68 P; 165/41, 44

[56] References Cited

U.S. PATENT DOCUMENTS 3,827,521 8/1974 Welsh ................................ 180/54 A
4,016,945 4/1977 Shibata ................................ 180/229

FOREIGN PATENT DOCUMENTS 1002645 2/1957 Fed. Rep. of Germany ...... 180/225
1077820 5/1954 France ................................. 165/44
141194 4/1920 United Kingdom ............... 180/225

Primary Examiner—John A. Pekar
Attorney, Agent, or Firm—Donald D. Mon

[57] ABSTRACT

A motorcycle is equipped with a water cooled engine and a radiator for the engine. The radiator is mounted to the front fork of the vehicle. A number (symbol) displaying plate is mounted to the front fork ahead of the radiator. An opening is placed adjacent to the mounting plate, and air guides are placed so that the on coming air is guided to the radiator, preferably as a laminar flow.

6 Claims, 6 Drawing Figures

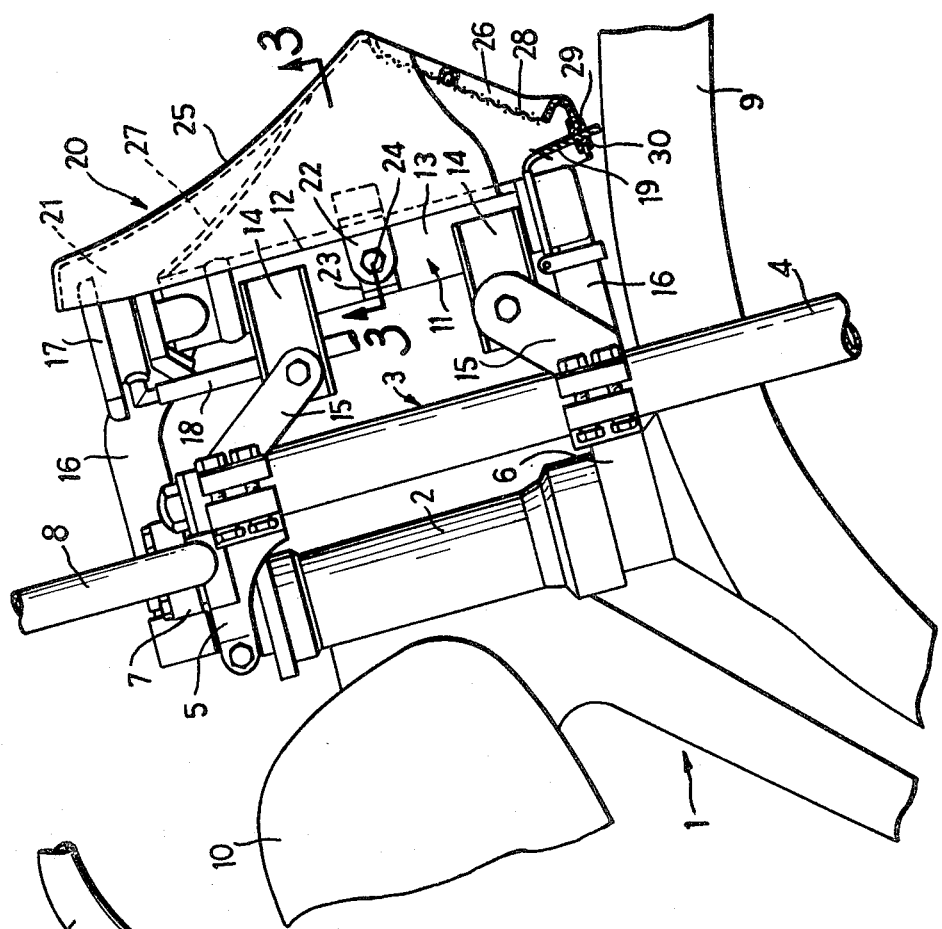
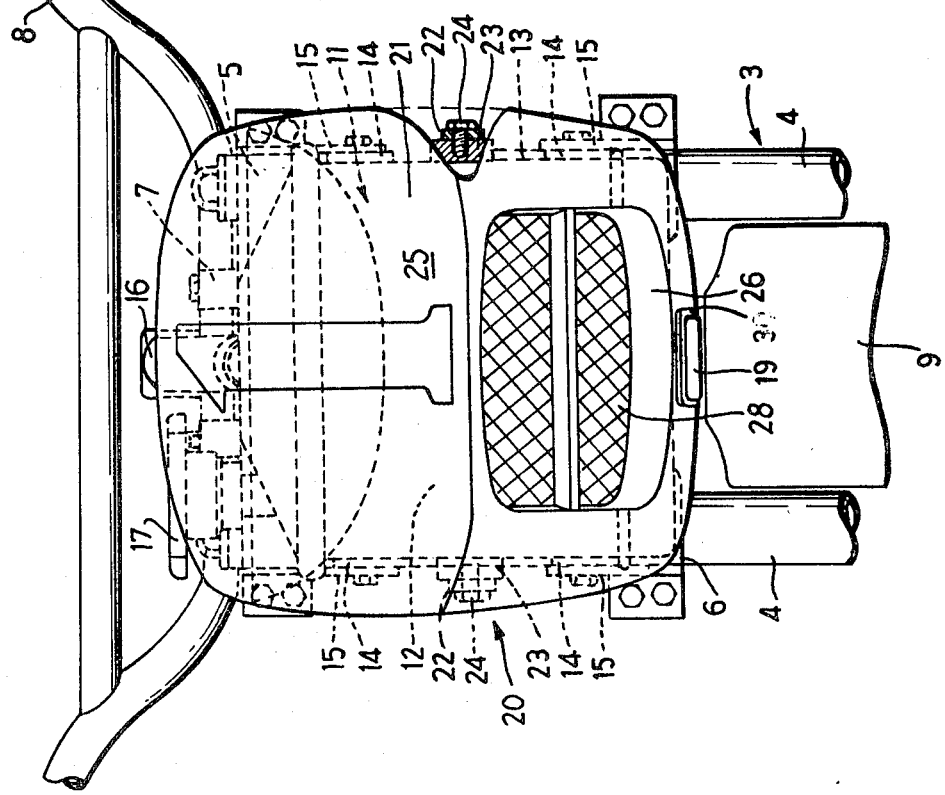

MOTORCYCLE FRONT SYMBOL PLATE

FIELD OF THE INVENTION

The present invention relates to a motorcycle which is equipped with a water-cooled engine and which has its radiator arranged at the back of a front number (symbol) plate, and more particularly to a construction of the aforementioned front number plate.

BACKGROUND OF THE INVENTION

For example, a motorcycle to be used in the sport of motocross riding, namely the competitive running on an unpaved country road, the so-called "motocross vehicle" is required to have its number displayed at the front of its body, particularly at the front of its front fork. The number is usually displayed on the front side of a front number plate located above the front fender.

In the motocross vehicle, there is a recent tendency to use water-cooled engines with a view to improving the cooling capacity of the engine. It is difficult to provide a space for mounting the radiator on the vehicle, but still the radiator has to be placed at such a position as will be sufficiently exposed to the oncoming wind during the running operation, and where it is less likely to be attacked by mud or other splashed material. Therefore, the radiator is frequently placed at the back of the front number plate. With this disposition, however, there arises a drawback that the oncoming wind is shielded by the front number plate so that the cooling capacity is accordingly reduced.

It is an object of the present invention, conceived in view of the background thus far described, to provide a front number plate for a motorcycle wherein the oncoming wind can be sufficiently guided to the whole surface of a radiator without disadvantage to the number displaying seat, notwithstanding that the radiator is arranged at the back of the front number plate, thereby improve the cooling capacity of the engine.

BRIEF DESCRIPTION OF THE INVENTION

The invention is carried out with a motorcycle which has a water-cooled engine and a radiator for the engine. The radiator is mounted to the front fork. A symbol (number) plate is mounted to the front fork ahead of the radiator. An air opening is disposed adjacent to the plate, and air guide means is provided to guide the oncoming air, preferably in laminar flow, to the radiator.

The above and other features of the invention will be fully understood from the following detailed description and the accompanying drawings, in which:

BRIEF DESCRIPTION OF THE DRAWINGS

FIG. 1 is a front elevation of the presently-preferred embodiment of the invention;

FIG. 2 is a side view of FIG. 1;

In FIGS. 1-3 there is shown a frame 1 which has a head pipe 2, to which is hinged a front fork 3. To the upper portions of a pair of inner tubes 4 constructing front fork 3, there are attached an upper bracket 5 and an under bracket 6. A handle 8 is fixed to the upper side of the upper bracket 5 through a handle holder 7, whereas a front fender 9 is fixed to the lower side of the under bracket 6. A fuel tank 10 is shown.

Figure 3:
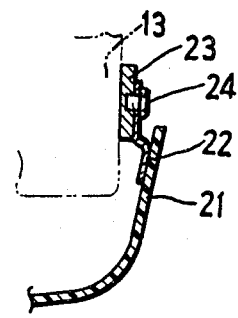
FIG. 3 is a fragmentary cross-section taken at line III—III in FIG. 2.

A radiator 11 is disposed in front of the front fork 3 and above front fender 9. Radiator 11 thus disposed is equipped with a radiator core 12 which has corrugated type cooling fans, for example. Two stays 14 are attached to each side portion of a core frame 13 supporting radiator core 12. Stays 14 are connected through respective brackets 15 to upper bracket 5 and under bracket 6 at both of their sides. Radiator 11 is fixed so that radiator core 12 has its front side facing forwardly of the frame of the motorcycle. Radiator 11 is connected through cooling water pipes 16 with the water jacket (not shown) of an engine (also not shown). A radiator cap 17 and an overflow pipe 18, are shown. A retaining member 19 protrudes downwardly from the lower center portion of core frame 13 so that it is fitted on a shock-absorbing rubber member to be described later.

In front of radiator 11, there is disposed a front number plate 20 according to the present invention. More specifically, a body 21, which is made of a synthetic resin, for example, and which is formed into a box shape with its rear side opened. To the inner surfaces of both of the two sides of plate body 12, there are attached the ends of supporting stays 22, the other ends of which are arranged to face fixing members 23 which have a predetermined thickness and are disposed at both sides of core frame 13. Plate body 21 is fixed to cover the front side of the radiator 11 by bolts 24 which can be fastened on supporting stays 22 and fixing members 23. On the other hand, the front side of plate body 21 provides a number displaying seat 25, which is curved so as to extend forward from the upper edge thereof and on which the number of the motorcycle or the like is displayed. The portion of the front side of plate body 21 lower than displaying seat 25 is inclined backward, and this inclined portion is formed with an opening 26 for guiding the oncoming wind to the front side of radiator 11. On the back side of number displaying seat 25, i.e., on the side facing the radiator 11, there is provided an air guide plate 27 which extends along the oriented direction of the aforementioned opening 26 from the upper edge of opening 26 toward the upper edge of the front side of radiator 11. Incidentally, opening 26 is covered with a protecting net 28 which blocks foreign obstacles such as mud splashed during the running operation of the motorcycle from reaching radiator 11. A shock-absorbing rubber member 30 is formed with a slit groove 29 and is mounted at the center of the lower side of the opening of plate body 21 so that the aforementioned retaining member 19 is removably fitted in that slit groove 29. As a result, front number plate 20 is fixed on radiator 11 such that it is supported at three points.

According to the construction thus far described, since plate body 12 is formed with opening 26, the oncoming wind enters through opening 26 and impinges onto radiator 11. In this instance, the oncoming wind introduced through opening 26 flows along air guide plate 27 toward the upper edge of the front side of the radiator 11 so that the wind flow is forcibly made laminar toward the front side of the radiator 11. As a result, the flow rate of the air which flows through radiator 11 is increased so that the cooling effect is effected notwithstanding that the front number plate 20 is arranged in front of the radiator 11. Therefore, the construction according to the first embodiment thus far described is suitable for the motocross vehicles or the like, in which the engine has a high calorific value. Moreover, since the number displaying seat 25 is curved to protrude forward, the length of the seat can be substantially increased, so that the number or the like can be displayed clearly in a large size.

Upon the practice of the aforementioned first embodiment, incidentally, there arises no difficulty even if either opening 26 or number displaying seat 25 is arranged at a right angle with respect to the running direction of the body of the motocrossor.

Figure 4:
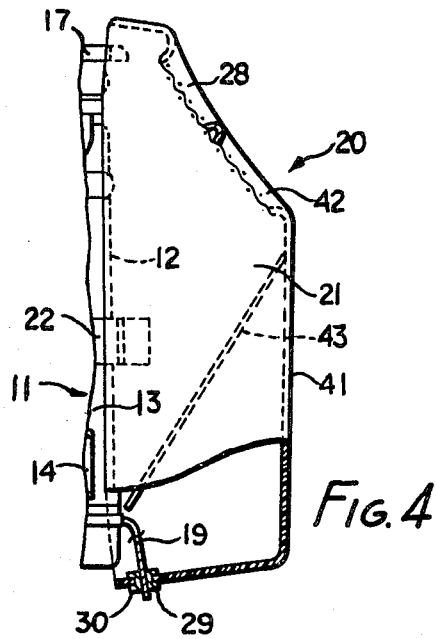
FIGS. 4, 5 and 6 are fragmentary side views, partly in cutaway cross-section, showing three other embodiments of the invention.

Moreover, the present invention should not be limited to the aforementioned first embodiment but can be further exemplified in a second embodiment, as shown in FIG. 4. In this second embodiment, plate body 21 has its number displaying seat 41 arranged at a right angle with respect to the running direction of the vehicular body. Moreover, an opening 42, which is inclined to have its upper edge disposed at the back, is formed above displaying seat 41, and an air guide plate 43, which protrudes from the lower edge of opening 42 toward the lower edge of the front side of radiator 11, is provided at the side of the aforementioned displaying seat 41 facing radiator 11. According to this second embodiment, the direction of the oncoming wind introduced from opening 42 is also forcibly made laminar toward the front side of radiator 11 so that a similar effect to that of the aforementioned first embodiment can be attained. Since opening 42 is positioned above plate body 21, there can be attained another advantage, namely that it is much more difficult for the mud or the like to be splashed into opening 42 during the running operation.

Figure 5:
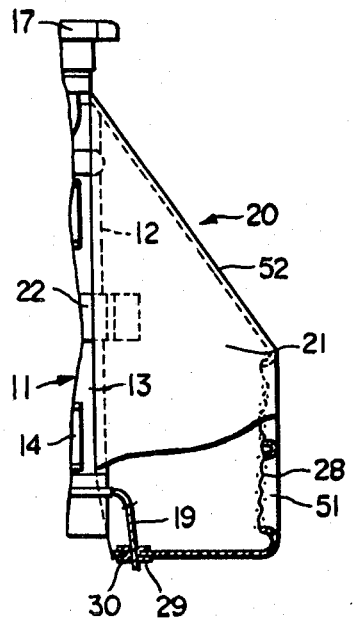

According to a third embodiment shown in FIG. 5, plate body 21 is formed with an opening 51 which is formed at the right angle with respect to the running direction of the vehicular body, and a number displaying seat 52, which is disposed above opening 51, is inclined from the upper end of the aforementioned opening 51 toward the upper portion of radiator 11 so that number displaying seat 52 is made to function also as the air guide plate. According to the third embodiment, not only the cooling capacity of radiator 11 is improved but also there is no necessity from providing a separate air guide plate. The overall construction can thereby be simplified.

Figure 6:
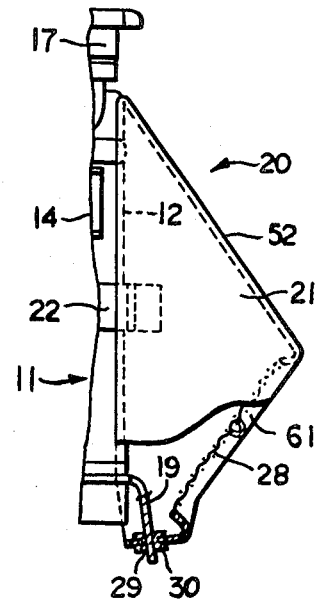

If an opening 61 is inclined so as to have its lower edge positioned at the back according to a fourth embodiment, as shown in FIG. 6, the oncoming wind is introduced substantially along the surface side of number displaying seat 52 so that the flow laminating effect can be improved more uniformly to introduce the oncoming wind onto the front side of the radiator 11.

In the respective embodiments thus far described, although the radiator is disposed in front of the front fork, it may instead be disposed to merge into the front portion of the fuel tank, for example.

As has been described hereinbefore, according to the present invention, a front number plate for use in a motorcycle of the type, in which a radiator is arranged at the back of the front number plate, is characterized in that the front side of the front number plate provides a number displaying seat, that an opening is formed at a portion adjacent to the number displaying seat, and that an air guide plate extending from the edge portion of the opening toward the radiator is disposed at the back of the number displaying seat. As a result, the oncoming wind introduced from that opening flows along the air guide plate toward the front side of the radiator so that its flow direction is made laminar. As a result, the oncoming wind can be efficiently introduced onto the radiator, notwithstanding that the front number plate is positioned in front of the radiator, so that the cooling capacity can be improved. Since, moreover, the number displaying seat is spaced from the opening, the number or the like can be clearly displayed and that the intrinsic function of the front number plate is not adversely affected.

This invention is not to be limited by the embodiments shown in the drawings and described in the description, which are given by way of example and not of limitation, but only in accordance with the scope of the appended claims.

I claim:

1. A front number holder for use in combination with a motorcycle of the type which includes a frame, a front fork, a water-cooled engine, and, mounted to said front fork and facing forwardly therefrom, a radiator, said holder comprising;
   a hollow body mounted to said front fork forwardly of said radiator, having a forwardly-facing opening and a peripheral continuous wall forming a compartment with an open rear end facing said radiator, whereby to confine and direct rearwardly flowing air from the opening to the radiator, and a number displaying seat portion facing forwardly on said body adjacent to said opening, said seat portion at least partially occluding said radiator.

2. A front number holder according to claim 8 in which said body includes a pair of spaced apart generally upright side walls.

3. A front number plate according to claim 1 in which an air guide plate is disposed behind said seat portion to direct said air.

4. A front number plate according to claim 1 in which said opening is below said seat portion.

5. A front number plate according to claim 1 in which said opening is above said portion.

6. A front number plate according to claim 1 in which said seat portion slants whereby to be elongated relative to its length if it were made upright.

* * * * *